(12) United States Patent
Houghton

(10) Patent No.: US 6,962,373 B2
(45) Date of Patent: Nov. 8, 2005

(54) PIPE FITTING WITH COMPOSITE GASKET ASSEMBLY

(75) Inventor: Jon Houghton, Rochester Hills, MI (US)

(73) Assignee: Plastic Trends, Inc., Shelby Township, MI (US)

(*) Notice: Subject to any disclaimer, the term of this patent is extended or adjusted under 35 U.S.C. 154(b) by 172 days.

(21) Appl. No.: 10/313,298

(22) Filed: Dec. 6, 2002

(65) Prior Publication Data
US 2004/0108714 A1 Jun. 10, 2004

(51) Int. Cl.⁷ .................................................. F16L 17/00
(52) U.S. Cl. .................. 285/110; 285/374; 277/626; 277/627; 277/647; 277/651
(58) Field of Search ............................ 285/104, 918, 285/110, 374; 277/627, 650, 651, 644, 647, 626

(56) References Cited

U.S. PATENT DOCUMENTS

| | | | | |
|---|---|---|---|---|
| 2,434,484 A | * | 1/1948 | Chambers, Jr. | 277/553 |
| 2,529,098 A | * | 11/1950 | Noll | 277/626 |
| 2,809,853 A | * | 10/1957 | Nathan | 277/607 |
| 3,595,588 A | * | 7/1971 | Rode | 277/650 |
| 3,799,586 A | * | 3/1974 | Caras et al. | 285/98 |
| 3,857,589 A | * | 12/1974 | Oostenbrink | 277/615 |
| 4,362,323 A | * | 12/1982 | Lodder et al. | 285/4 |
| 4,991,858 A | * | 2/1991 | Abila et al. | 277/606 |
| 5,064,207 A | * | 11/1991 | Bengtsson | 277/616 |
| 5,201,835 A | * | 4/1993 | Hosie | 277/314 |
| 5,324,083 A | * | 6/1994 | Vogelsang | 285/110 |
| 5,941,576 A | * | 8/1999 | Krausz | 285/110 |

* cited by examiner

Primary Examiner—James M. Hewitt
(74) Attorney, Agent, or Firm—Dykema Gossett PLLC

(57) ABSTRACT

A pipe fitting includes a body having sockets for receiving pipes therein and a composite gasket housed within a circumferential gasket retention housing integral with the socket. The composite gaskets include a V-shaped carrier of relatively stiff plastic having an elastomeric seal portion bonded thereto.

13 Claims, 2 Drawing Sheets

PIPE FITTING WITH COMPOSITE GASKET ASSEMBLY

BACKGROUND OF THE INVENTION

1. Field of the Invention

The present invention relates to a pipe fitting and gasket assembly for conducting fluid flow.

2. Disclosure Information

Fluid conducting pipes have been available with slip fittings for a number of years. Some fittings with slip fits use an external nut to tighten a packing on the inserted pipe. This mechanism, however, requires labor and additional parts and may be awkward to install, particularly in below ground or otherwise confined spaces. Other types of slip fittings, particularly those used in applications such as drain or sewer pipes, have used slip fittings without the need for tightening a nut. For example, FIG. 2 illustrates a prior art seal in which plastic band 202 is combined with a very large elastomeric part 200. Unfortunately, the gasket or seal of FIG. 2 is quite expensive due to the need to provide this large elastomeric body.

SUMMARY OF THE INVENTION

A pipe fitting for telescopically receiving at least one pipe includes a body having a generally cylindrical wall defining an opening for receiving a pipe. A circumferential gasket retention region projects radially outwardly from a portion of the generally cylindrical wall, so as to define an annular gasket retention race or channel. A gasket having a generally V-shaped cross-section is provided within the gasket retention channel and includes a V-shaped carrier portion of relatively stiff plastic and an elastomeric seal-forming portion. The gasket is adapted to be radially and elastically compressed by a pipe inserted axially into the fitting body. In a preferred embodiment, the V-shaped carrier portion and elastomeric sealing portion may be co-molded, with the elastomeric portion being formed from a resilient material and the V-shape carrier being formed from a relatively stiffer material. In this manner, the inventive gasket seal may be easily and economically produced by co-molding.

The gasket of the present invention has an outer leg adapted to abut the floor of the gasket retention channel. The gasket further has an inner leg hinged to the outer leg with the inner leg being adapted to abut a pipe inserted into a fitting into which the gasket has been seated.

The elastomeric seal portion of the inner leg of the gasket preferably includes an annular sealing flap or ring extending radially inwardly from the gasket body such that a pipe inserted telescopically into the fitting compresses the annular sealing ring while simultaneously elastically deforming the V-shaped carrier.

It is an advantage of the present invention that a pipe fitting and gasket assembly according to this invention produces superior results in terms of performance under vacuum and resistance to pressure conditions.

It is a further advantage of the present system that leak tight sealing is provided without the need for the use of special tools for assembling various pipe fittings.

Other advantages, as well as objects and features of the present invention, will become apparent to the reader of this specification.

DETAILED DESCRIPTION OF THE PREFERRED EMBODIMENTS

Figure 1:
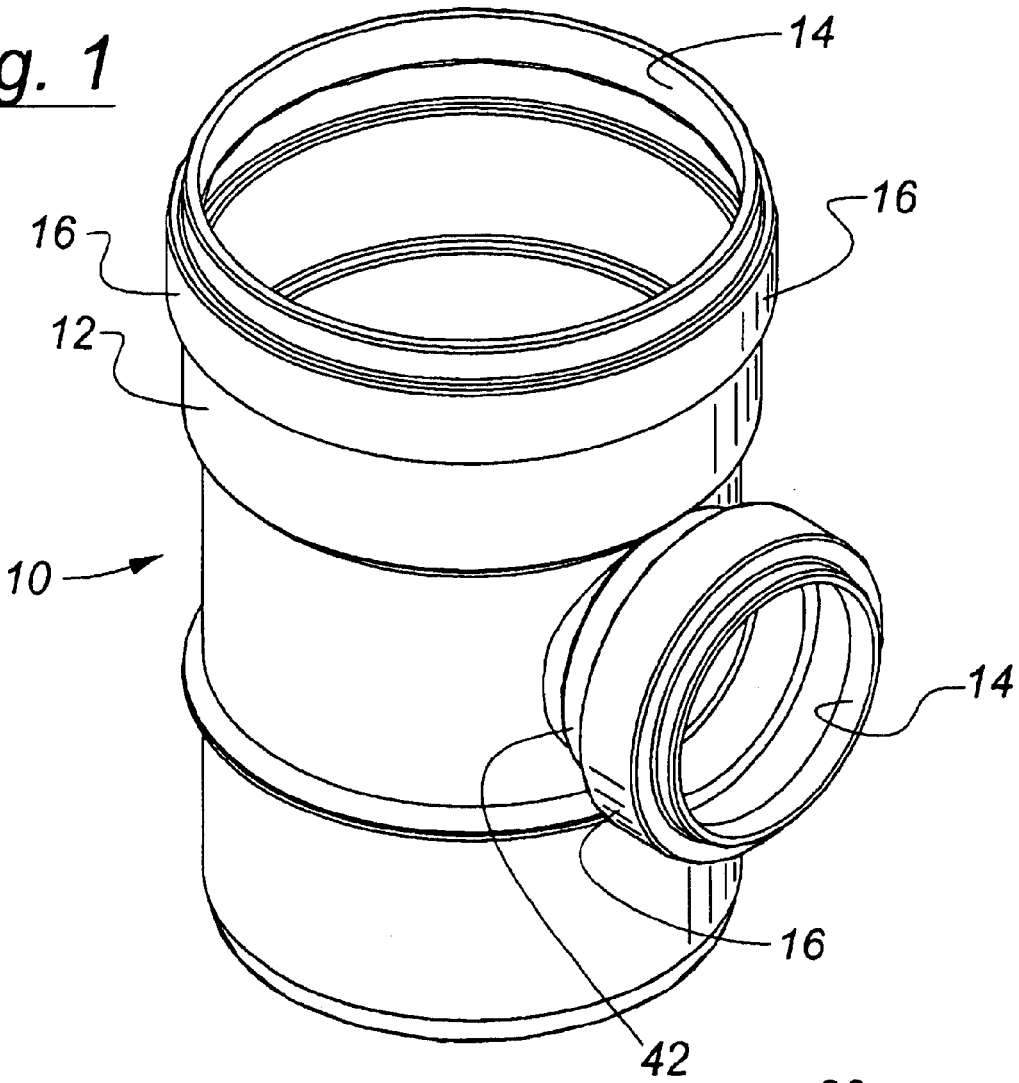
FIG. 1 is a perspective view of a pipe fitting having a sealing system according to present invention.

As shown in FIG. 1, pipe fitting 10 (typically formed of PVC) has generally cylindrical wall 12 with a plurality of generally cylindrical sockets or openings 14 for receiving pipes (such as pipe 52 in FIG. 4) inserted into fitting 10. Gasket 18 is used for sealing pipe 52 in fitting 10. Gasket 18 is inserted into and retained by a gasket retention portion 16. As shown with more specificity in FIG. 4, gasket retention portion 16 defines an annular gasket retention channel 17 into which a gasket 18 maybe snapped so as to retain gasket 18 both axially and radially.

Figure 3:
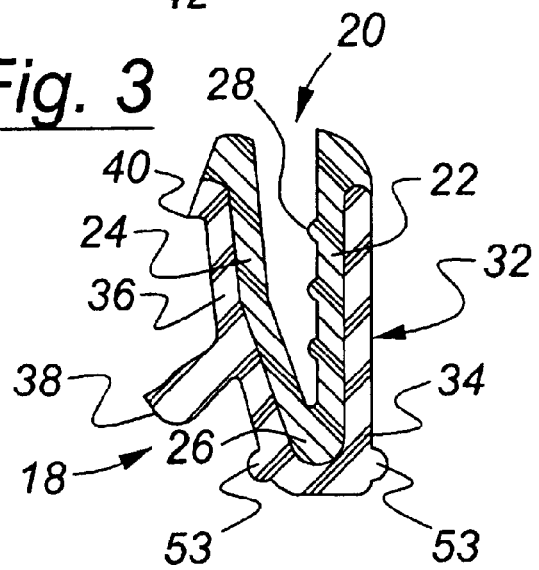
FIG. 3 illustrates a gasket assembly according to one aspect of the present invention.

The details of gasket 18 in the preferred embodiment are shown in FIG. 3. Gasket 18 is preferably a composite of two types of molded materials, but may be a single type of material fabricated to provide two different hardnesses. V-shaped carrier portion 20 serves essentially as a spring element for gasket 18 and preferably comprises polyethylene. Those skilled in the art will appreciate in view of this disclosure that the material for V-shaped carrier portion 20 may be selected from a variety of other known materials such as polypropylene, polystyrene, ABS or other plastics. It will be understood from the present disclosure that the material from which V-shaped carrier portion 20 is formed should be stiff, yet must flex at hinge portion 26 (best seen in FIG. 3) repeatedly without cracking or breaking. In other words, V-shaped carrier portion 20 biases inner leg 24 against pipe 52 as will be explained more fully hereinafter. Most preferably, V-shaped carrier portion 20 should have a hardness (Shore D durometer) of between about 40 to 50.

Figure 4:
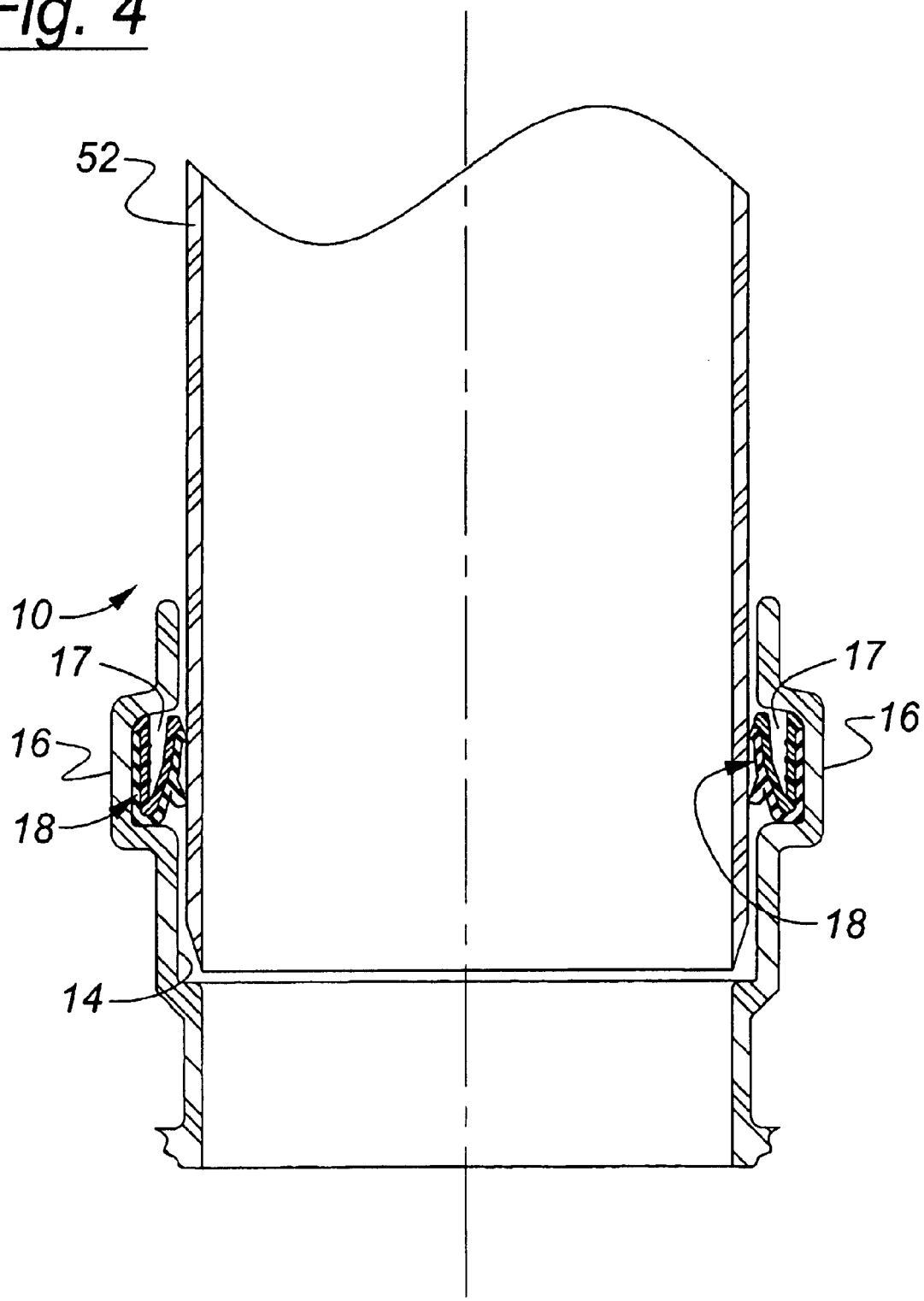
FIG. 4 illustrates a pipe fitting and joint assembly according to one aspect of the present invention.

V-shaped carrier portion 20 includes outer leg 22 which biases gasket 18 against the outer circumference or floor of the annular gasket retention channel 17 defined by gasket retention housing 16; inner leg 24 biases against pipe 52 inserted into fitting 10. As stated, V-shaped carrier portion 20 has a hinge portion 26 which allows the V to flex. Referring to FIG. 4, pipe 52 is telescopically inserted into fitting 10. In turn, gasket 18 is radially compressed by pipe 52 when pipe 52 is inserted into fitting 10. In other words, the V-shaped nature of gasket 18 along with the stiffness of carrier portion 20 creates a spring biasing effect. V-shaped carrier 20 preferably also has a plurality of annular bump stops 28 which help prevent carrier portion 20 from collapsing or deforming more than a predetermined amount under radially directed stress imposed by pipe 52 inserted in the fitting 10. Additional annular beads, such as bead 53 of FIG. 3 may be provided to further control the biasing force of gasket 18.

Figure 2:
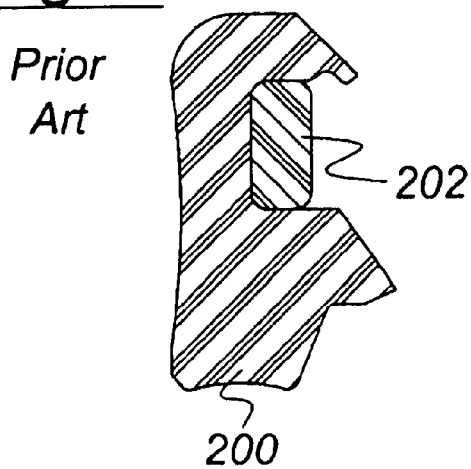
FIG. 2 illustrates a prior art gasket assembly.

Elastomeric seal portion 32 comprises an integral part of gasket 18. Elastomeric seal portion 32 may be made of a number of elastomeric materials known to those skilled in the art such as polyethylene, polypropylene, natural or synthetic rubber, neoprene, nitriles, polyvinyl and various other resilient materials. It will be recognized from the present disclosure that the material used to form elastomeric seal portion 32 is preferably an elastomer or elastomerized material, most preferably having a hardness (Shore A durometer) of from about 45 to about 65 and a more preferably from about 50 to about 60. Elastomeric seal portion 32 has an outer portion 34 which bears against the floor of gasket retention housing portion 16. Elastomeric seal 32 also has an inner portion 36, which in this embodiment (with the remainder of elastomeric seal 32), is bonded to V-shaped carrier 20. Co-molding or co-extrusion of carrier 20 with elastomeric seal portion 32 is expected to comprise an economical process for manufacturing gasket 18. It should be noted that the amount of elastomeric material needed to fabricate a gasket according to the present invention is much less than that required for the prior art gasket illustrated in FIG. 2 due to the "V" cutout. As a result, the cost savings offered by the inventor's gasket may be considerable. As stated, alternatively, carrier 20 and sealing portion 32 may be made of the same type of material, so long as carrier 20 is stiffer than sealing portion 32.

Elastomeric seal portion 32 includes an annular sealing ring or projection 38 which extends radially inwardly from inner portion 36 of elastomeric seal 32, such that a pipe inserted telescopically into fitting 10 compresses and deflects annular sealing ring 38 while simultaneously elastically deforming V-shaped carrier 20 as best shown in FIG. 4.

In order to assure that debris which may be adhering to the outside of pipe 52 does not interfere with annular sealing ring 38, elastomeric seal 32 is further equipped with scraper ring or wiper 40 which extends radially inwardly from inner portion 36 of seal 32, so as to physically remove deposits such as dirt or small rocks from the surface of a pipe as it is inserted into fitting 10. This assures an excellent seal between the outer wall of the pipe being inserted and elastomeric seal 32. Alternatively, the scraper ring may be formed on V-shaped carrier 20. Under vacuum conditions, wiper 40 also helps provide a tight seal.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed:

1. A pipe fitting for telescopically receiving at least one pipe, said fitting comprising:
    a body having a generally cylindrical wall defining an opening for receiving a pipe;
    said body further defining an annular gasket retention space; and
    a gasket housed within said annular gasket retention space, said gasket having a V-shaped portion and a sealing portion, said V-shaped portion being formed of a stiffer material than said sealing portion;
    said V-shaped portion having a hinge portion and a pair of legs, said pair of legs extending away from said hinge portion;
    wherein said gasket is positioned in said annular gasket retention space such that the hinge portion of said V-shaped portion is farther away from said opening for receiving a pipe than said pair of legs, said pair of legs extending toward said opening for receiving a pipe; and
    wherein said sealing portion has an annular sealing ring.

2. A pipe fitting according to claim 1, wherein said gasket is radially compressed by a pipe inserted axially into said opening for receiving a pipe.

3. A pipe fitting according to claim 1, wherein said gasket is elastically and radially compressed by a pipe inserted axially into said opening for receiving a pipe.

4. A pipe fitting according to claim 1, wherein said V-shaped portion and said sealing portion are co-molded.

5. A pipe fitting according to claim 1, wherein said V-shaped portion is elastically deformed by a pipe inserted telescopically into said opening for receiving a pipe.

6. A pipe fitting according to claim 1, wherein said gasket seals against a flow of sewage through said pipe fitting.

7. A pipe fitting according to claim 1, wherein said V-shaped portion is formed from low density polyethylene.

8. A pipe fitting according to claim 1, wherein said sealing portion is an elastomeric material.

9. A pipe fitting according to claim 1, wherein said sealing portion is formed from synthetic rubber.

10. A pipe fitting according to claim 1, wherein said pair of legs includes an inner leg and an outer leg and said sealing portion further comprises a scraper ring integral with and extending radially inwardly from said inner leg of said V-shaped portion, such that a portion of an outside surface of a pipe inserted into said fitting will be scraped as the pipe is inserted.

11. A pipe fitting according to claim 1, wherein said body is molded of plastic.

12. A pipe fitting according to claim 1, wherein said body is molded of polyvinylchloride.

13. The pipe fitting recited in claim 1, wherein said sealing portion has a plurality of external annular beads.

* * * * *